United States Patent [19]

Sakano

[11] Patent Number: 4,542,327
[45] Date of Patent: Sep. 17, 1985

[54] SPEED CONTROL APPARATUS

[75] Inventor: Tetsuro Sakano, Mitaka, Japan

[73] Assignee: Fanuc Ltd., Tokyo, Japan

[21] Appl. No.: 435,364

[22] Filed: Oct. 20, 1982

[30] Foreign Application Priority Data

Oct. 22, 1981 [JP] Japan ................................ 56-169018

[51] Int. Cl.⁴ ............................................ G05B 19/24
[52] U.S. Cl. .................................... 318/571; 318/570; 318/603
[58] Field of Search ............... 318/570, 571, 601, 603, 318/618

[56] References Cited

U.S. PATENT DOCUMENTS 3,500,023 3/1970 Arrowood et al. ................... 235/92
4,215,301 7/1980 Mason ................................ 318/603
4,331,910 5/1982 Kohzai et al. ....................... 318/618
4,388,570 6/1983 Sangree ............................... 318/255

FOREIGN PATENT DOCUMENTS 0014241 8/1980 European Pat. Off. .
2024465 1/1980 United Kingdom .

OTHER PUBLICATIONS

European Search Report, The Hague, Oct. 17, 1984.
Annex to European Search Report on European Appln. No. EP82305570.

Primary Examiner—William M. Shoop, Jr.
Assistant Examiner—Saul M. Bergmann
Attorney, Agent, or Firm—Staas & Halsey

[57] ABSTRACT

A speed control apparatus according to the present invention includes a pulse generator for generating a number of pulses proportional to an angle of rotation of a servomotor, a speed signal generator for converting the frequency of the pulses into a voltage indicative of an actual speed of the servomotor in order to feed back the voltage through negative feedback, a detector for detecting reversal of the direction of rotation of the servomotor, a positional change detector for detecting the change in a position of the servomotor after the reversal of the direction of rotation of the servomotor by counting the pulses produced by the pulse generator, and a circuit for lowering the voltage indicative of an actual speed until the position of the servomotor has changed beyond a predetermined amount.

10 Claims, 3 Drawing Figures

SPEED CONTROL APPARATUS

BACKGROUND OF THE INVENTION

The present invention relates to a speed control apparatus, and more particularly to a speed control apparatus for controlling the speed of movement of movable member of a machine tool such as a table or a tool.

Numerically controlled machine tools have servomotors such as feed motors and spindle motors which are controlled by a control unit so that the difference determined between a voltage dependent on a command speed (hereinafter referred to as a "command speed voltage") and a voltage dependent on an actual speed (hereinafter referred to as an "actual speed voltage") will be eliminated. The servomotors are coupled to movable members such as a table, a tool or a spindle for moving or rotating them at the command speed.

Where the natural frequency of the mechanical load coupled to such a servomotor is close to that of the speed feedback loop and the mechanical load has a reduced frictional load component and a low oscillation damping factor, the speed control has a disadvantage in that resonance is caused between the speed control system and the mechanical system and the load is subjected to hunting when it is stopped. The load is more likely to suffer from hunting particularly in an application in which a position detector generates positional information proportional to the angle of rotation of the servomotor and a signal indicative of an actual speed is derived from the positional information for speed feedback. In a typical application, the position detector comprises a pulse generator for producing pulse signals APP and BPP (FIG. 1 of the accompanying drawings) of phases A and B, respectively, which are out of phase by $\pi/2$. A pulse is generated each time the servomotor rotates through a predetermined angle. The speed signal is generated by a frequency voltage (F/V) converter for converting the frequency of A-phase or B-phase pulses into a corresponding voltage. As illustrated in FIG. 1, when the pulse signal APP, waveform (A) has a high logic level ("1") and the pulse signal BPP, waveform (B), has a low logic level ("0") at the dotted-line position P and the mechanical load, such as a table, is to be stopped at the position P, the table oscillates across the position P due to the resonance as described above. The pulses in waveform (C) (FIG. 1) are produced as the pulse signal APP and are regarded as pulses generated upon movement of the table in a positive direction.

More specifically, the F/V converter generates an actual speed voltage indicating movement of the table in a negative direction when pulses APP are produced in response to movement of the table to the right of point P, and indicating movement of the table in a positive direction when pulses APP are produced in response to movement of the table to the left of point P. Therefore, the servo control circuit operates to cancel out the actual speed voltage when the table is oscillating about point P. The pulses APP in waveform (C) in FIG. 1 are generated when the table moves to the right in its oscillatory motion, the F/V converter produces an actual speed voltage by determining that the movable member has moved a predetermined distance in the positive direction each time such pulses are produced and the servo control circuit is energized to cancel the actual speed voltage thus produced. When the movable member oscillates across the dot-and-dash-line position P′ in FIG. 1, the pulse signal APP of phase A as illustrated in waveform (D) in FIG. 1 is generated, and these pulses are regarded as having been produced by movement of the movable member in the negative direction.

SUMMARY OF THE INVENTION

It is an object of the present invention to provide a speed control apparatus for controlling the speed of travel of a mechanical movable member so that the latter will not suffer from hunting when it is stopped.

According to the present invention, a speed control apparatus includes a pulse generator for generating a number of pulses proportional to an angle of rotation of a servomotor, a speed signal generator for converting the frequency of the pulses into a voltage indicative of an actual speed of the servomotor in order to feed back the voltage through negative feedback, a detector for detecting reversal of the direction of rotation of the servomotor, a positional change detector for detecting a change in a position of the servomotor after the reversal of the direction of rotation of the servomotor by counting the pulses produced by the pulse generator, and a circuit for lowering the voltage indicative of an actual speed until the position of the servomotor has changed beyond predetermined amount.

The above and other objects, features and advantages of the present invention will become more apparent from the following description when taken in conjunction with the accompanying drawings in which preferred embodiments of the present invention are disclosed by way of illustrative examples.

DESCRIPTION OF THE PREFERRED EMBODIMENTS

Figure 2:
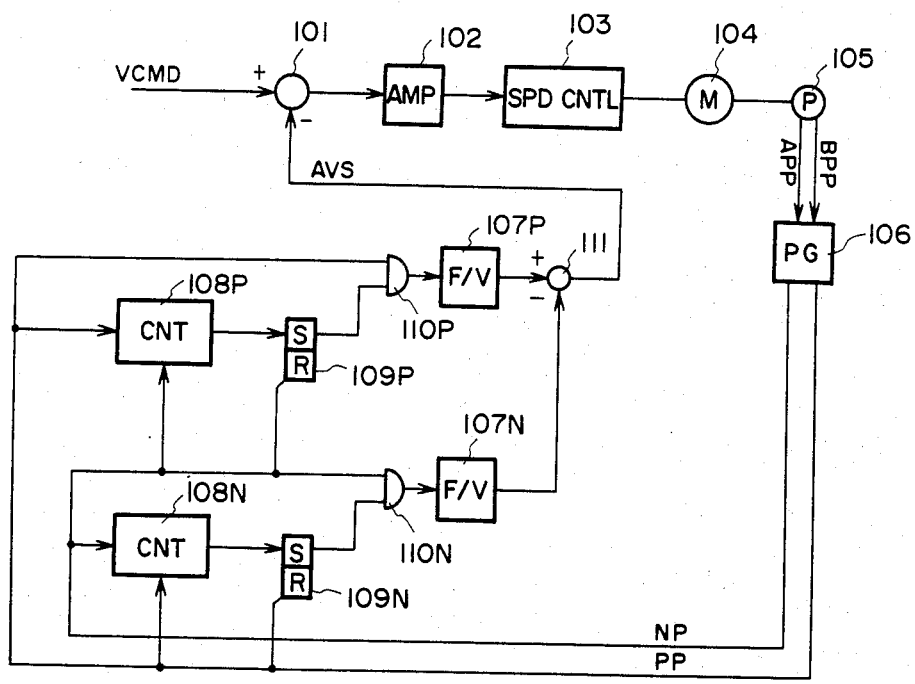
FIG. 2 is a block diagram of a speed control apparatus according to an embodiment of the present invention.

FIG. 2 is a block diagram of a speed control apparatus according to an embodiment of the present invention. The speed control apparatus includes an analog arithmetic unit 101 for computing the difference between a speed command voltage VCMD and an actual speed voltage AVS, an amplifier 102, a speed control circuit 103, a servomotor 104 such as an AC motor or a DC motor, a pulse generator 105 and a positive/negative pulse generator 106. The pulse generator 105 is a position coder or a pulse coder for generating pulses APP and BPP of phases A and B, respectively, which are out of phase by $\pi/2$, and produced each time the servomotor 104 rotates through a predetermined angle. The positive/negative pulse generator 106 receives the pulses APP and BPP and produces positive-direction pulses PP and negative-direction pulses NP. The analog arithmetic unit 101 and the amplifier 102 may comprise differential amplifiers. The positive/negative pulse generator 106 monitors the phases of the phase-A pulses APP and the phase-B pulses BPP, and produces the positive-direction pulses PP each time the servomotor 104 rotates through the predetermined angle by determining that the servomotor 104 rotates in a positive direction when the phase-A pulses APP are generated first, or the negative-direction pulses NP each time the servomotor 104 rotates through the predetermined angle by determining that the servomotor 104 rotates in a negative direction when the phase-B pulses BPP are generated first.

The speed control apparatus also has F/V converters 107P and 107N for converting the pulse frequencies of the positive-direction pulses PP and the negative-direction pulses NP into corresponding voltages, and counters 108P and 108N for counting the positive-direction pulses PP and the negative-direction pulses NP, respectively. The counter 108P is reset upon generation of a negative-direction pulse NP and the counter 108N is reset upon generation of the positive-direction pulses PP. A flip-flop 109P is set by a carry pulse generated by the counter 108P and reset by a negative-direction pulse NP. A flip-flop 109N is set by a carry pulse generated by the counter 108N and reset by a positive-direction pulse PP. Also included are AND gates 110P and 110N which when the corresponding flip-flops 109P and 109N are set, deliver the positive-direction pulses PP and the negative-direction pulses NP, respectively, to the F/V converters 107P and 107N. A synthesizer circuit 111 combines signals supplied from the F/V converters 107P and 107N.

Operation of the speed control apparatus of FIG. 2 will now be described. It is assumed that when the servomotor 104 is stopped it will oscillate through an interval corresponding to M pulses generated by the pulse generator 105, and each counter 108P and 108N has a capacity to count at least M pulses. When the servomotor 104 is brought to a stop after it has rotated in a positive direction, the counter 108N and the flip-flop 109N are reset by a positive-direction pulse PP, and the AND gate 110N is closed. If the servomotor 104 begins to oscillate moving in a negative direction at this time, then the pulse generator 105 and the positive-/negative pulse generator 106 produce M negative-direction pulses NP, which reset the counter 108P and the flip-flop 109P and are counted by the counter 108N. Since the flip-flop 109N remains reset until the M negative-direction pulses NP are successively produced to cause the counter 108N to generate a carry pulse, the AND gate 110N remains closed preventing the negative-direction pulses NP generated by the foregoing oscillation from being delivered to the F/V converter 107N. Thus, the servomotor 104 is not rotated by the negative-direction pulses. Likewise, when the servomotor 104 continues to oscillate by moving in the positive direction after it has moved in the negative direction, thereby producing M positive-direction pulses PP, the servomotor 104 is not rotated by such positive-direction pulses PP. Although the foregoing description is directed to the oscillation corresponding to M pulses, the actual oscillation is quite small with M=1 as a maximum.

Figure 1:
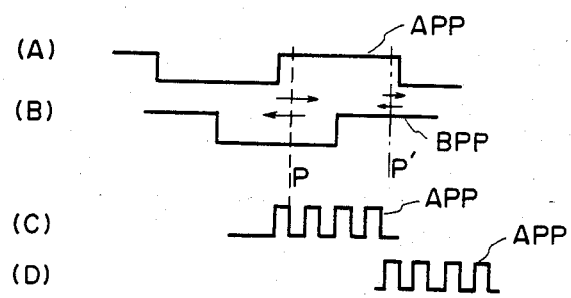
FIG. 1 is a diagram of waveforms describing the manner in which hunting takes place.

With the actual speed signal having a blind zone corresponding to M pulses, the servomotor 104 and a table coupled thereto are caused only to oscillate at their natural frequencies and small natural amplitudes, and there is no danger of the oscillation being increased until hunting takes place. If there were no counters 108P and 108N, no flip-flops 109P and 109N, no AND gates 110P and 110N, and the positive-direction pulses PP and the negative-direction pulses NP were directly delivered to the F/V converters 107P and 107N, then the servomotor 104 would oscillate through angles of rotation corresponding to single pulses alternately in the positive and negative directions due to a small oscillation as illustrated in FIG. 1, resulting in hunting.

Figure 3:
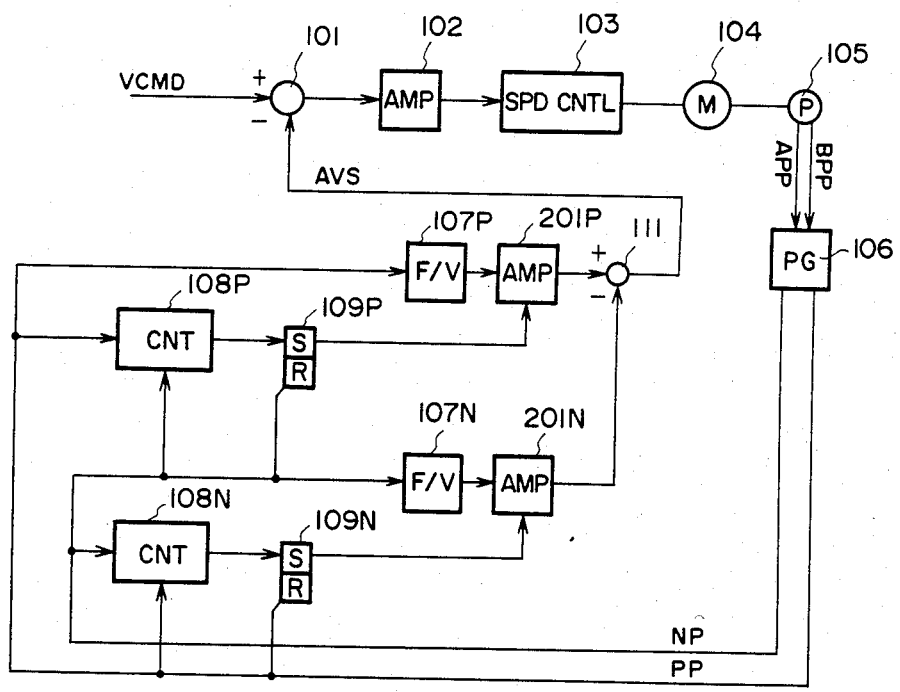
FIG. 3 is a block diagram of a speed control apparatus according to another embodiment of the present invention.

FIG. 3 illustrates a speed control apparatus according to another embodiment of the present invention. Identical parts in FIG. 3 are denoted by the identical reference characters used in FIG. 2.

The speed control apparatus illustrated in FIG. 3 is different from the speed control apparatus of FIG. 2 in that the AND gates 110P and 110N are dispensed with, and amplifiers 201P and 201N each with controllable gain are connected to outputs of the F/V converters 107P and 107N, respectively, the arrangement being that the gains of the amplifiers 201P and 201N are controlled dependent on whether the flip-flops 109P and 109N are set or not. For example, when the flip-flops 109P and 109N are reset, the gains of the amplifiers 201P and 201N are respectively reduced to lower the actual speed voltage AVS until it is zeroed. When the flip-flops 109P and 109N are set, the gains of the amplifiers 210P and 210N are respectively increased up to normal levels. As a result, the actual speed voltage can have a blind zone or a zone of low sensitivity which prevents motor oscillation from being increased until the motor suffers from hunting.

In this embodiment of the invention, since the actual speed voltage includes a blind zone or a zone of low sensitivity, a mechanical movable member such as a servomotor or a table is not subjected to be hunting when it is stopped. While in the illustrated embodiments the pulse generator is mounted on the servomotor, the pulse generator may be mounted on the table or other members.

Although certain preferred embodiments have been shown and described in detail, it should be understood that many changes and modifications may be made therein without departing from the scope of the appended claims.

What we claim is:

1. A speed control apparatus for a servomotor, comprising:
   a position detector for generating positional information proportional to an angle of rotation of the servomotor;
   first means for generating speed information based on the positional information in order to feed back said speed information as actual speed information through negative feedback;
   second means, operatively connected to said position detector, for detecting reversal of the direction of rotation of the servomotor;
   third means, operatively connected to said second means, for detecting a change in the position of the servomotor based on the positional information including the direction of rotation of the servomotor; and
   fourth means, operatively connected to said first, second and third means, for substantially blocking said speed information until the position of the servomotor is changed beyond a predetermined amount.

2. A speed control apparatus according to claim 1, wherein said position detector comprises a pulse generator, operatively connected to said second means, for generating a number of pulses, the number being proportional to the angle of rotation of the servomotor, and said first means comprises a first frequency/voltage converter, operatively connected to said fourth means and the servomotor, for converting the frequency of the pulses generated by said pulse generator into a voltage.

3. A speed control apparatus according to claim 2, wherein said third means comprises a counter, operatively connected to said second and fourth means, for counting the pulses generated by said pulse generator when the direction of rotation of the servomotor is reversed.

4. A speed control apparatus according to claim 3, wherein said fourth means prevents the pulses generated by said pulse generator from being supplied to said first frequency/voltage converter until said counter counts pulses up to a predetermined count.

5. A speed control apparatus according to claim 3, wherein said fourth means comprises a variable-gain amplifier, operatively connected to said first means, said third means and the servomotor, for amplifying an output from said first frequency/voltage converter, said variable-gain amplifier having a variable gain lowered while said counter counts the reverse direction pulses up to a predetermined count.

6. A speed control apparatus according to claim 2,
wherein said second means generates positive-direction pulses in response to rotation of the servomotor in a positive direction and negative-direction pulses in response to rotation of the servomotor in a negative direction, and
wherein said third means comprises:
a first counter, operatively connected to said second means, responsive to negative-direction pulses for clearing a count thereof and counting positive-direction pulses;
a second counter, operatively connected to said second means, responsive to positive-direction pulses for clearing a count thereof and counting negative-direction pulses;
a first flip-flop, operatively connected to said fourth means and said fourth counter, which is set when the count in said first counter reaches a predetermined value and reset by a negative-direction pulse; and
a second flip-flop, operatively connected to said fourth means and said second counter, which is set when the count in said second counter reaches the predetermined value and reset by a positive-direction pulse.

7. A speed control apparatus according to claim 6, wherein said first frequency/voltage converter converts the frequency of the positive-direction pulses into the voltage and said first means further comprises a second frequency/voltage converter, operatively connected to said second means, for converting the frequency of the negative-direction pulses into a voltage, and
wherein said fourth means comprises:
a first AND gate, operatively connected to said second means, said first flip-flop and said first frequency/voltage converter, for ANDing the output of said first flip-flop with the positive-direction pulses; and
a second AND gate, operatively connected to said second means, said second flip-flop and said second frequency/voltage converter, for ANDing the output of said second flip-flop with the negative-direction pulses.

8. A speed control apparatus according to claim 6,
wherein said first frequency/voltage converter converts the frequency of the positive-direction pulses into the voltage, and said first means further comprises a second frequency/voltage converter, operatively connected to said second means, for converting the frequency of the negative-direction pulses into a voltage, and
wherein said fourth means comprises:
a first variable-gain amplifier, operatively connected to said first flip-flop and said first frequency/voltage converter, for amplifying the output from said first frequency/voltage converter, having a gain with a first level when said first flip-flop is set and a lower second level when said first flip-flop is reset; and
a second variable-gain amplifier, operatively connected to said second flip-flop and said second frequency/voltage converter, for amplifying the output from said second frequency/voltage converter, having a gain with a first level when said second flip-flop is set and a lower second level when said second flip-flop is reset.

9. A speed control apparatus according to claim 7, wherein said first means further comprises a synthesizer, operatively connected to said first and second frequency/voltage converters, subtracting the output of said second frequency/voltage converter from the output of said first frequency/voltage converter to generate the actual speed information.

10. A speed control apparatus according to claim 8, wherein said first means further comprises a synthesizer, operatively connected to said first and second variable-gain amplifiers, subtracting the output of said second variable-gain amplifier from the output of said first variable-gain amplifier to generate the actual speed information.

* * * * *

UNITED STATES PATENT AND TRADEMARK OFFICE
CERTIFICATE OF CORRECTION

PATENT NO. : 4,542,327
DATED : September 17, 1985
INVENTOR(S) : Sakano

It is certified that error appears in the above-identified patent and that said Letters Patent is hereby corrected as shown below:

Col. 1, line 38, "frequency voltage" should be --frequency/voltage--;

line 41, after "(A)" insert --,--.

Col. 2, line 24, after "beyond" insert --a--.

Col. 3, line 20, after "which" insert --,--;

line 36, after "oscillate" insert --,--.

Col. 4, line 20, "210P" should be --201P--.

Col. 5, line 38, "fourth" should be --first--.

Signed and Sealed this

Twenty-fifth Day of February 1986

[SEAL]

Attest:

DONALD J. QUIGG

Attesting Officer  Commissioner of Patents and Trademarks